United States Patent [19]

Dommes et al.

[11] 4,207,742
[45] Jun. 17, 1980

[54] ENGINE WITH SHUNTABLE TURBOCHARGER

[75] Inventors: Werner Dommes, Ingolstadt; Alfre Härtl, Gaimersheim; Hans-Werner Pölzl, Ingolstadt, all of Fed. Rep. of Germany

[73] Assignee: Audinsu Auto Union AG, Neckarsulm, Fed. Rep. of Germany

[21] Appl. No.: 898,416

[22] Filed: Apr. 20, 1978

[30] Foreign Application Priority Data

Apr. 21, 1977 [DE] Fed. Rep. of Germany ....... 2717684

[51] Int. Cl.² ............................................ F02B 37/00
[52] U.S. Cl. ........................................ 60/602; 60/605
[58] Field of Search ................. 60/600, 601, 602, 603, 60/605

[56] References Cited

U.S. PATENT DOCUMENTS

| 2,369,175 | 2/1945 | Prince | 60/602 X |
| 2,431,563 | 11/1947 | Johansson | 60/602 |
| 3,077,071 | 2/1963 | Leichtfuss | 60/605 |
| 3,217,487 | 11/1965 | Rothe | 60/602 |
| 3,930,747 | 1/1976 | Woollenweber | 60/605 X |
| 4,008,572 | 2/1977 | Woollenweber | 60/602 |

*Primary Examiner*—Michael Koczo
*Attorney, Agent, or Firm*—Karl F. Ross

[57] ABSTRACT

An engine has a plurality of cylinders each having an exhaust-gas output. An exhaust-gas turbocharger has a plurality of exhaust-gas inlets which are connected via respective exhaust-gas conduits to the outlets of the cylinders, with each conduit connected to one or more of the cylinders. A vent conduit connects at least one of the exhaust-gas conduits to the output side of the exhaust-gas turbocharger and is provided with a valve that releases pressure in the respective conduit when pressure in the exhaust system or engine speed exceeds a predetermined limit. Furthermore this one conduit is of restricted flow-cross-section so that at low engine speed the gas velocity in the conduit is high for driving the turbocharger, but at high engine speed pressure is relieved to prevent overdriving of the turbocharger.

9 Claims, 3 Drawing Figures

ENGINE WITH SHUNTABLE TURBOCHARGER

FIELD OF THE INVENTION

The present invention relates to an engine system. More particularly this invention concerns a motor-vehicle engine having an exhaust-gas-powered turbocharger.

BACKGROUND OF THE INVENTION

It is known to use the exhaust gases issuing from the cylinders of an internal-combustion engine to drive a turbine which in turn drives a compressor that acts as a turbocharger for the cylinder intakes. In this manner the energy in the exhaust gases is exploited to increase the engine efficiency by compressing the air fed into the engine and mixed with the fuel.

The main problem in such a system is that the fresh-air requirements for the engine, the exhaust-manifold pressure, and the efficiency of the turbine and compressor all vary independently of each other. Thus if a compressor is provided which is driven at full speed when the engine is operating relatively slowly, too much air will be provided at higher speeds so that the ignition peak pressure will be exceeded and knocking will result. Similarly if a smaller compressor is provided the exhaust-manifold pressure at low speeds will be insufficient to operate it fast enough to supply sufficient air for operation.

Various arrangements have been suggested to overcome this matching problem, normally employing relative complex clutches and valve arrangements none of which have been found to be satisfactory or sufficiently simple for use in a motor vehicle where engine speed varies enormously and the entire system must be as compact and rugged as possible.

OBJECTS OF THE INVENTION

It is therefore an object of the present invention to provide an improved engine system.

Another object is to provide a turbocharged internal-combustion engine system wherein the output of the turbocompressor can be matched over a wide range of engine speeds to the fresh-air requirements of the engine.

SUMMARY OF THE INVENTION

These objects are attained according to the present invention in an engine system wherein a plurality of exhaust-gas conduits each extend between a respective inlet of the exhaust-gas turbocharger and a respective number of exhaust-gas outputs of the engine. One of these conduits is of smaller flow cross-section than the others so that the gas speed therein at all speeds is substantially higher than in the others. This one conduit is also connected to a vent conduit having a relief valve so that when a predetermined engine speed is exceeded or a predetermined exhaust-manifold pressure is exceeded this valve opens.

Thus in accordance with the instant invention at relatively slow speed the exhaust gases flowing out of the restricted exhaust-gas conduit will move at relatively high speed and will drive the turbocharger at a sufficiently high speed to supply the engine air requirements. At a higher speed, however, the relief valve opens to relieve pressure inside the one restricted gas conduit to prevent disadvantageous pressure backup in this conduit. The system therefore allows the turbocharger output to be matched rather exactly to the engine's fresh-air requirements.

According to further features of this invention all but the one restricted exhaust-gas conduit have a flow cross section proportional to the respective number of cylinders. The restriction can be simply provided in the one conduit near the inlet of the turbocharger, or may be provided directly at the inlet of the turbocharger by appropriate formation of an inlet plate.

Furthermore according to this invention it is possible to provide another such relief valve and vent conduit on another one of the exhaust-gas conduits in a system wherein three or more such conduits are provided.

The system of this invention can easily be adapted for use in a turbocharged diesel engine to increase the efficiency thereof. The downstream side of the relief valve can be connected to the exhaust pipe coming from the outlet of the turbocharger so that in effect this relief valve operates as a shunt or bypass across the exhaust-gas turbine of the turbocharger.

SPECIFIC DESCRIPTION

Figure 1:
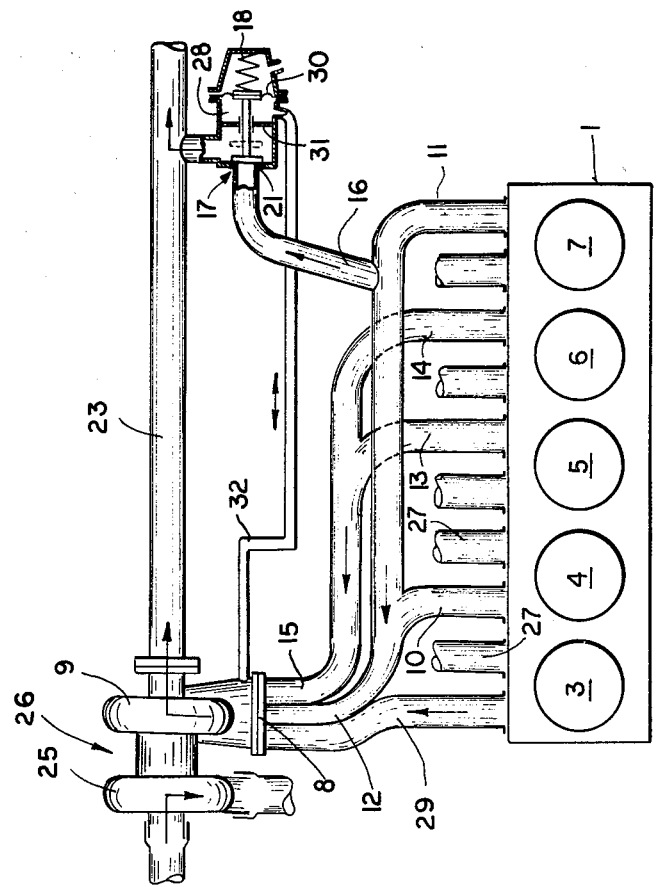
FIG. 1 is a perspective view of an embodiment of the engine system according to this invention.

As shown in FIG. 1 a five-cylinder in-line diesel engine 1 has cylinders 3–7 each having an intake 27. Cylinders 3–7 also have respective exhaust outlets 29, 10, 13, 14 and 11. The conduits 13 and 14 are connected together at a manifold 15 and the conduits 10 and 11 at a manifold 12. The conduit 29 and the manifolds 12 and 15 are connected at an inlet plate 8 to the intake side 22 of an exhaust-gas turbine 9 of a turbocharger 26. A turbocompressor 25 is driven by this turbine 9 and is connected to the intakes 27.

According to this invention the manifold 12 is connected to a vent conduit 16 provided with a pressure-relief valve 17 connected to the exhaust output conduit 23 of the exhaust system. This valve 17 has a valve body 21 biased into the closed position by a spring 18 and displaceable into the open position by pressure in a chamber 28 formed between a membrane 30 and a partition 31 in the valve 17. A connection line 32 extends between the chamber 28 and the intake side 22 of the exhaust-gas turbine 9 downstream of the inlet plate 8. Thus when the pressure at the intake 22 of turbine 9 exceeds a predetermined level it compresses the spring 18 and opens the valve 17 to vent pressure from the manifold 12.

Figure 2:
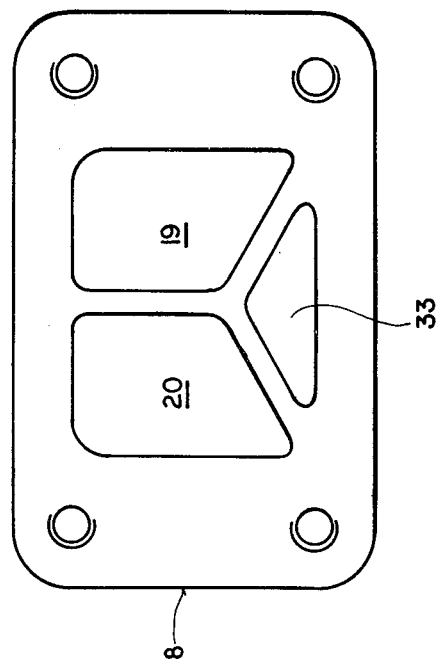
FIG. 2 is a plan view of an inlet plate according to this invention.

In accordance with this invention the manifold 12 opens into an inlet aperture 33 and conduit 29 and manifold 15 respectively open into apertures 20 and 19 shown in FIG. 2. The flow cross-section for the manifold 12 is reduced at 33.

Figure 3:
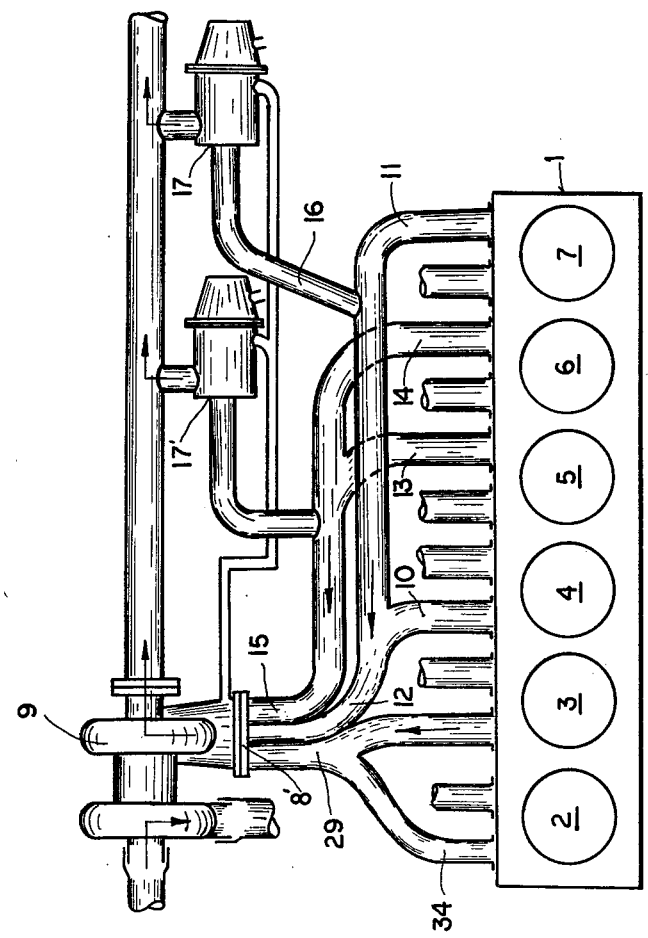
FIG. 3 is a view similar to FIG. 1 illustrating another arrangement in accordance with this invention.

This invention can also be seen in better detail in FIG. 3 which shows a diesel engine 1' having six cylinders 2–7. Here the exhaust-gas output 34 of the cylinder 2 is connected to the conduit 29. On the other hand the conduit 12 is restricted downstream of the vent conduit 16, but the conduit 15 feeds into the turbine 9 through a valve plate 8' having a reduced aperture. Also another relief valve 17' is provided for the conduit or manifold 15.

Thus FIGS. 1 to 3 make it apparent that the reduction in flow cross-section can be effected downstream of the vent line 16, either in the conduit or manifold near the inlet or at the inlet to the gas turbine.

In both of the above-described systems the restricted flow cross-section ensures high gas velocity at low speeds for driving of the gas turbine at sufficiently high speed to provide all of the fresh air needed for proper engine operation. As engine speed increases and the pressure in the exhaust system increases the pressure in these conduits is relieved somewhat to prevent overdriving of the turbine.

We claim:
1. An engine system comprising:
   an engine having a plurality of cylinders each having an exhaust-gas output;
   an exhaust-gas turbocharger having a plurality of exhaust-gas inlets;
   a plurality of exhaust-gas conduits each connecting a respective number of said exhaust-gas outputs to a respective exhaust-gas inlet;
   a vent conduit connected to one of said exhaust-gas conduits;
   valve means in said vent conduit for relieving pressure therein when exhaust-gas pressure exceeds a predetermined pressure level; and
   means in said one conduit for reducing the flow cross section near said exhaust-gas inlets, and thereby increasing flow velocity therein below said predetermined pressure level.

2. The system defined in claim 1 wherein said one exhaust conduit is of restricted flow cross section near said exhaust-gas inlets.

3. The system defined in claims 1 or 2, wherein said vent conduit is connected with said one conduit upstream of the region of restricted cross section.

4. The system defined in claim 1 wherein said means is constituted by an inlet plate at said inlets and formed with a plurality of apertures constituting said inlets for said exhaust-gas conduits.

5. The system defined in claim 4 wherein said aperture of said one conduit is smaller than substantially all of the other apertures.

6. The system defined in claim 1 wherein at least three such exhaust-gas conduits are provided and at least two thereof have such valve means and vent conduits.

7. The system defined in claim 1 wherein said valve means is responsive to pressure at said inlets.

8. The system defined in claim 1 wherein said vent conduit is connected to the output of said turbocharger and shunts same.

9. The system defined in claim 1 wherein said valve means includes a spring biasing said valve means into a closed position.

* * * * *